G. F. DISCHER.
ATTACHMENT FOR AUTOMOBILES.
APPLICATION FILED JAN. 31, 1916.
1,202,036.
Patented Oct. 24, 1916.
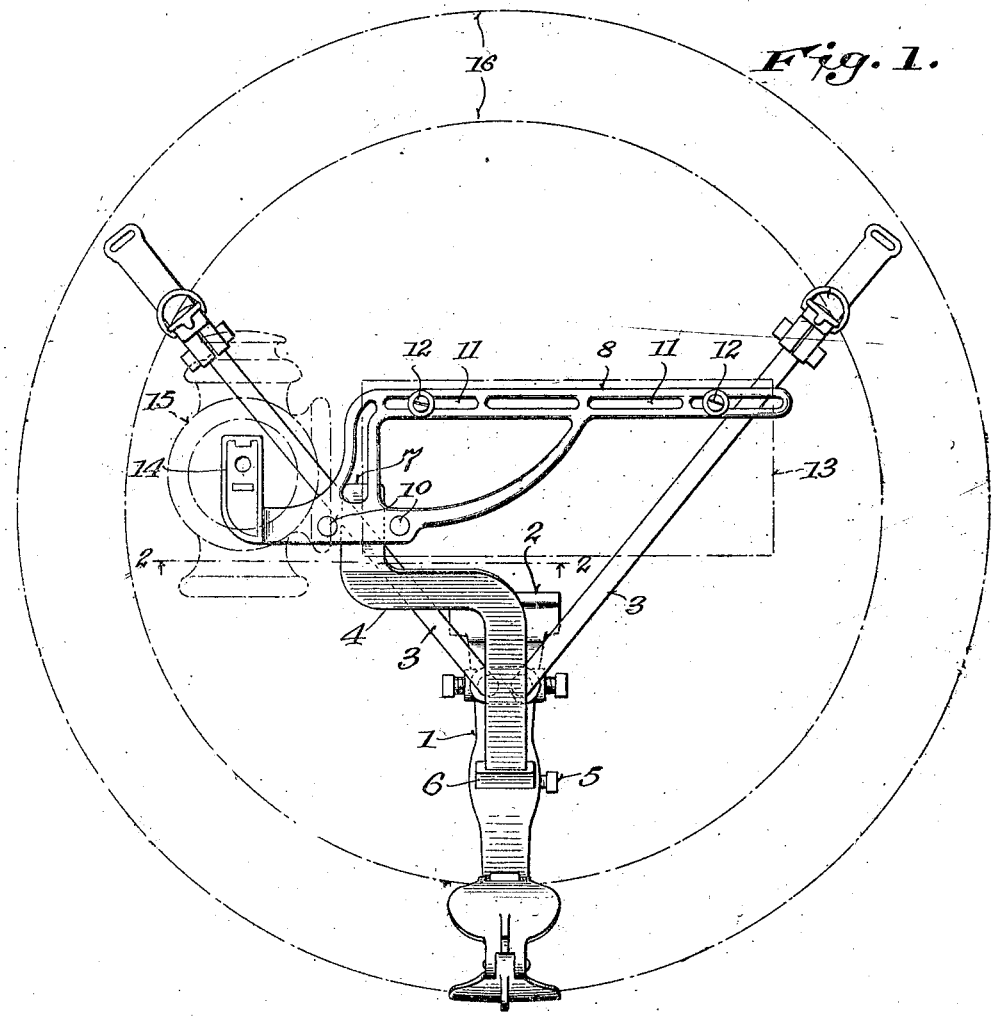
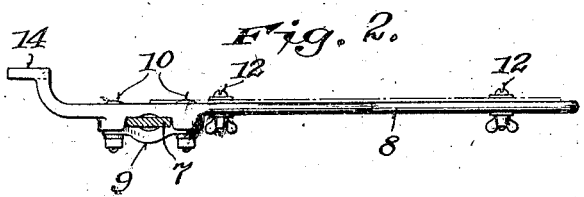

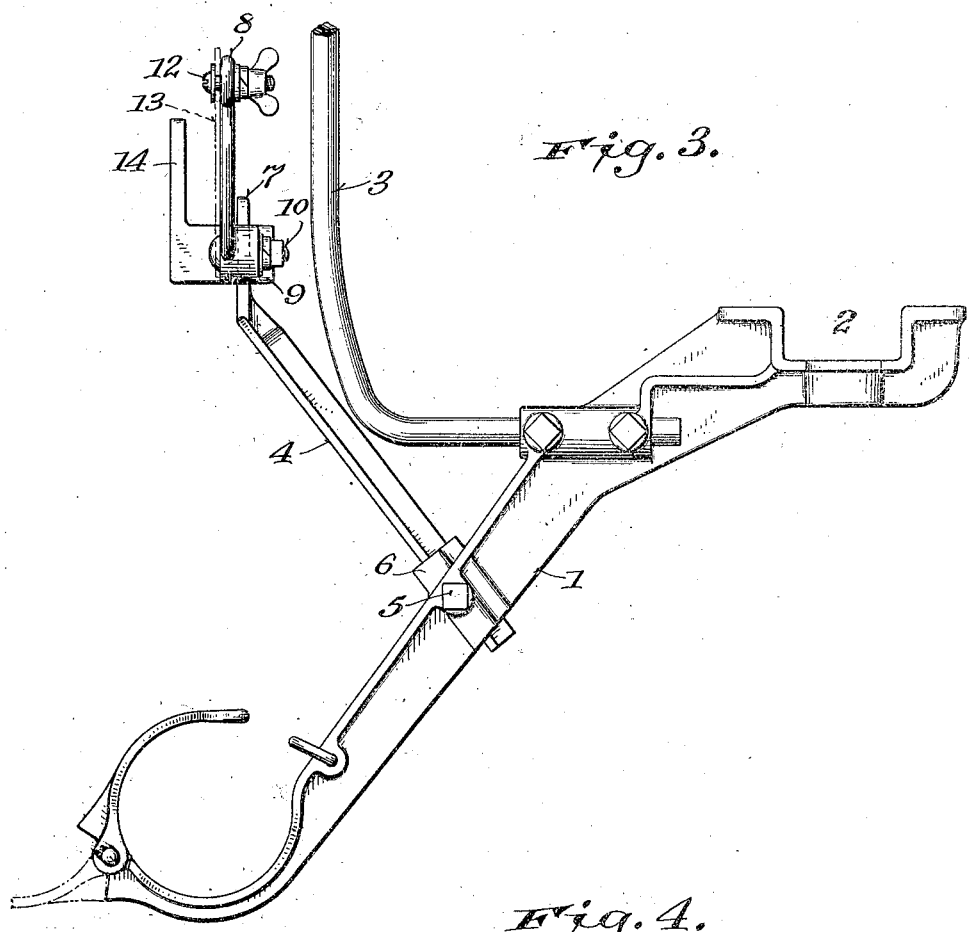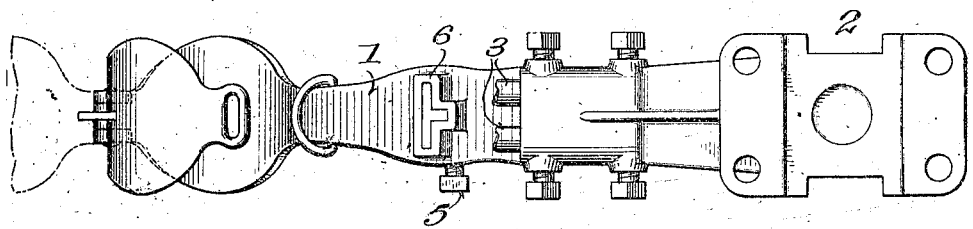

UNITED STATES PATENT OFFICE.

GRANT F. DISCHER, OF MILWAUKEE, WISCONSIN.

ATTACHMENT FOR AUTOMOBILES.

1,202,036.   Specification of Letters Patent.   Patented Oct. 24, 1916.

Application filed January 31, 1916. Serial No. 75,411.

*To all whom it may concern:*

Be it known that I, GRANT F. DISCHER, a citizen of the United States, residing at Milwaukee, in the county of Milwaukee and State of Wisconsin, have invented certain new and useful Improvements in Attachments for Automobiles, of which the following is a specification, reference being had to the accompanying drawing, forming a part thereof.

The main objects of this invention are to provide a combination spare tire holder and support for a lamp and license plate, or for either, having common means for attachment to a car, which can be easily and quickly applied to a car and can be taken apart and packed for transportation or storage in small compass; and generaly to increase the convenience and improve the construction of devices of this class.

It consists in the construction, arrangement and combination of parts as hereinafter particularly described and pointed out in the claims.

In the accompanying drawing like characters designate the same parts in the several figures.

Figure 1 is a rear elevation of a combined tire holder and lamp and license plate bracket or support embodying the invention as specially designed for Ford cars; Fig. 2 is a section on the line 2—2, Fig. 1, and an inverted plan view of the lamp bracket and license plate support; Fig. 3 is an enlarged side elevation of the device, parts of which are broken away; and Fig. 4 is a plan view of the tire supporting arm without the lamp bracket and license plate support.

The device comprises a tire supporting arm or bracket 1, provided with means such as a yoke 2, at its upper end, for fastening it to the rear spring at its junction with the frame of a Ford car in a rearwardly and downwardly inclined position, as shown in Fig. 3. At its lower end it is provided with the usual or any suitable means for supporting and fastening thereto one or more spare tires, as indicated by dotted lines in Fig. 1. It is also provided with two detachable and adjustable rods or branch arms 3, having at their free ends the usual or any suitable means for supporting and fastening thereto the upper part of one or more tires.

As thus far described, the tire holder is of a well known design and construction, and no claim thereto *per se* is made.

For carrying a license plate in clear view within the spare tire or tires, and a lamp in position to illuminate the license plate, as indicated by dotted lines in Fig. 1, the arm 1 is provided with an upwardly extending and rearwardly inclined arm 4, which is preferably of angular form or laterally offset adjacent to its upper end, as shown in Fig. 1. At its lower end it is removably fitted and detachably and adjustably fastened by a set screw 5 in a socket or hole in the arm 1, which is preferably enlarged at this point to form an extended bearing 6, and substantial support for the arm 4. At its upper end the arm 4 terminates in a flattened and substantially vertical tenon 7. To this tenon a cross bar or license plate support 8 is detachably and adjustably fastened by a clamp 9 and bolts 10. The cross bar or support 8 is formed with longitudinal slots 11 and provided with screws, washers and thumb nuts 12, for fastening the license plate, as indicated by dotted lines at 13 in Fig. 1, to said bar or support, the screws passing through the slots 11 and being adjustable lengthwise thereof for license plates of different shapes and sizes. At one end the bar or support 8 is formed or provided with a bracket or plate 14, adapted to support a tail or other lamp, as indicated by dotted lines at 15 in Fig. 1, in position to illuminate the license plate.

For convenience of storage and shipment, as well as of manufacture, the parts of which the device is composed are detached, assembled together and boxed or wrapped in a package of comparatively small compass, the rods 3, arm 4 and cross bar 8 being arranged close together parallel with the arm 1.

The arm 4 may be adjusted up and down in the arm 1, and the cross bar 8 with the bracket 14 may also be adjusted up and down on the tenon 7, to locate the license plate 13 and the lamp 15 in the desired relation to the spare tire or tires carried by the arm 1 and rods 3, as indicated by dotted lines 16 in Fig. 1. The means of attachment at the upper end of the arm 1 serving in common for the tire support, license plate support and lamp bracket, greatly simplifies and facilitates the application to a car of these several accesories. The single attachment also avoids marring the car to which such accessories are applied.

Various modifications in the details of construction and arrangement of parts may be made without departing from the principle and scope of the invention as defined in the following claims.

I claim:

1. A tire supporting arm having means at one end for attachment to a car at a rearward and downward inclination thereto and provided at its lower end with a tire support and at an intermediate point between its ends with a detachable upwardly extending lamp supporting arm.

2. A tire supporting arm having means for attachment to a car at a rearward and downward inclination thereto and provided at its lower end with a tire support and at an intermediate point between its ends with a detachable upwardly extending angular lamp and license plate supporting arm.

3. A tire supporting arm having means at one end for attaching it to a car and carrying an upwardly extending arm provided with a cross support for a license plate and at one end of said support with a bracket arranged to carry a lamp in position to illuminate the license plate.

4. A rearwardly and downwardly inclined tire supporting arm having means at the upper end for attachment to a car and a tire support at the lower end and provided at an intermediate point between its ends with an upwardly extending detachable arm, and a combined lamp bracket and license plate holder detachably fastened to said upwardly extending arm.

5. A rearwardly and downwardly inclined tire supporting arm having means at the upper end for attachment to a car, a tire support at the lower end and detachable and adjustable branch tire supporting arms, and provided at an intermediate point between its ends with an upwardly extending and vertically adjustable arm, and a combined lamp bracket and license plate holder detachably secured by a common fastening to said upwardly extending arm and adapted to support a lamp in position to illuminate the license plate.

6. A tire supporting arm having means for fastening a tire thereto and means at its upper end for attachment at a downward and rearward inclination to a car and provided with a detachable upwardly extending rearwardly inclined arm, and a cross support detachably fastened to said upwardly extending arm and provided with means for attachment thereto of a license plate and a lamp in position to illuminate the license plate.

In witness whereof I hereto affix my signature in presence of two witnesses.

GRANT F. DISCHER.

Witnesses:
 CHAS. L. GOSS,
 ALICE E. GOSS.